(12) United States Patent
Farid et al.

(10) Patent No.: US 12,705,289 B2
(45) **Date of Patent: *Aug. 11, 2026**

(54) SYSTEM AND METHOD FOR FINDING SIMILAR DOCUMENTS BASED ON SEMANTIC FACTUAL SIMILARITY

(71) Applicant: Thomson Reuters Enterprise Centre GmbH, Zug (CH)

(72) Inventors: Mina Farid, Waterloo (CA); Brian Zubert, Waterloo (CA); Lisa Bender, Alma (CA); Hella-Franziska Hoffmann, London (GB)

(73) Assignee: Thomson Reuters Enterprise Centre GmbH, Zug (CH)

( * ) Notice: Subject to any disclaimer, the term of this patent is extended or adjusted under 35 U.S.C. 154(b) by 12 days.

This patent is subject to a terminal disclaimer.

(21) Appl. No.: 18/502,510

(22) Filed: Nov. 6, 2023

(65) Prior Publication Data

US 2024/0078271 A1 Mar. 7, 2024

Related U.S. Application Data

(63) Continuation of application No. 15/822,522, filed on Nov. 27, 2017, now Pat. No. 11,934,465.

(Continued)

(51) Int. Cl.

*G06F 16/93* (2019.01)
*G06F 16/22* (2019.01)

(Continued)

(52) U.S. Cl.

CPC .............. *G06F 16/93* (2019.01); *G06F 16/22* (2019.01); *G06F 16/24578* (2019.01);

(Continued)

(58) Field of Classification Search

CPC .... G06F 16/93; G06F 16/22; G06F 16/24578; G06F 16/2465; G06F 16/285; G06F 16/36; G06F 2216/03; G06F 16/313; G06F 7/00

See application file for complete search history.

(56) References Cited

U.S. PATENT DOCUMENTS 5,933,822 A * 8/1999 Braden-Harder ... G06F 16/3344 707/999.005
6,901,399 B1 5/2005 Corston et al.

(Continued)

FOREIGN PATENT DOCUMENTS

| | | |
|---|---|---|
| KR | 2014-0052328 | 5/2014 |
| NZ | 578672 | 8/2012 |

OTHER PUBLICATIONS

U.S. Appl. No. 15/822,522, filed Nov. 27, 2017, 2018-0150459, Patented.

(Continued)

*Primary Examiner* — Aleksandr Kerzhner
*Assistant Examiner* — Samuel C Sharpless, III

(57) ABSTRACT

The present disclosure is directed towards systems and methods for finding documents that are similar to a reference text. The inventive systems and methods examine a set of collected documents to determine the facts present in those documents by, for example, extracting triplets and expanding them. A user's input reference text is similarly examined to extract and expand triplets therein and the facts identified with respect to the reference text are used as a basis to find documents having similar facts. The present disclosure is also related to systems and methods for mining facts from documents relating to a primary source such as a piece of legislation and using the mined facts to improve the results of subsequent searches.

20 Claims, 12 Drawing Sheets

Related U.S. Application Data

(60) Provisional application No. 62/550,839, filed on Aug. 28, 2017, provisional application No. 62/426,727, filed on Nov. 28, 2016.

(51) Int. Cl.

| | |
|---|---|
| ***G06F 16/2457*** | (2019.01) |
| ***G06F 16/2458*** | (2019.01) |
| ***G06F 16/28*** | (2019.01) |
| ***G06F 16/36*** | (2019.01) |

(52) U.S. Cl.
CPC ........ *G06F 16/2465* (2019.01); *G06F 16/285* (2019.01); *G06F 16/36* (2019.01); *G06F 2216/03* (2013.01)

(56) References Cited

U.S. PATENT DOCUMENTS

| | | | |
|---|---|---|---|
| 9,208,223 | B1 | 12/2015 | Patil et al. |
| 11,561,987 | B1 * | 1/2023 | Sager .................... G06F 16/906 |
| 2003/0074352 | A1 | 4/2003 | Raboczi et al. |
| 2006/0004725 | A1 | 1/2006 | Abraido-Fandino |
| 2010/0114563 | A1 | 5/2010 | Choi et al. |
| 2010/0332511 | A1 | 12/2010 | Stockton et al. |
| 2013/0173604 | A1 | 7/2013 | Li et al. |
| 2014/0040275 | A1 | 2/2014 | Dang et al. |
| 2016/0012126 | A1 | 1/2016 | Franceschini et al. |
| 2016/0123572 | A1 | 5/2016 | Mohadjeri |
| 2016/0132572 | A1 | 5/2016 | Chang et al. |
| 2016/0275180 | A1 | 9/2016 | Matskevich |
| 2017/0132730 | A1 | 5/2017 | Takuma et al. |
| 2017/0275180 | A1 | 9/2017 | Liu |
| 2017/0357906 | A1 | 12/2017 | Bishop et al. |

OTHER PUBLICATIONS

International Search Report and Written Opinion for International Application No. PCT/IB2017/57427 dated Mar. 12, 2018 (11 pages).

Finn et al., "Information Retrieval and the Semantic Web," dated Jan. 3, 2005.

M. Thangaraj et al., "An Architectural Design for Effective Information Retrieval in Semantic Web, Expert Systems with Applications," vol. 41, No. 18, Dec. 1, 2014.

Brahim, Batouche et al, "Parsing Text into RDF graphs", [Retrieved on Mar. 23, 2020] Retrieved from the Internet: URL:https://gplsi.dlsi.ua.es/sepin15/sites/gplsi.dlsi.ua.es.sepin15/files/attachments/BatoucheEtalPosterSEPLN2015.pdf.

Partial European Search Report for European Patent Application No. 17874367.0 dated Apr. 9, 2020.

1st Office Action for European Application No. 17874367.0 dated Jan. 4, 2022 (7 pages).

Office Action for Canadian Patent Application No. 3,045,066 dated Oct. 5, 2022 (4 pages).

Examination Report for Canadian Patent Application No. 3,045,066 dated Jul. 17, 2003 (4 pages).

1st Examination Report for Australia Patent Application No. 2022235583 dated Aug. 15, 2023 (3 pages).

2nd New Zealand Examination Report for New Zealand Patent Application No. 753580 dated Jul. 1, 2022 ((9 pages).

1st New Zealand Examination Report for New Zealand Patent Application No. 753580 dated Nov. 8, 2021 (5 pages).

International Preliminary Report on Patentability received for PCT Patent Application No. PCT/IB2017/057427, mailed on Jun. 6, 2019, 7 pages.

* cited by examiner

Fig. 7

SYSTEM AND METHOD FOR FINDING SIMILAR DOCUMENTS BASED ON SEMANTIC FACTUAL SIMILARITY

CROSS-REFERENCE TO RELATED APPLICATIONS

This application is a continuation of U.S. patent application Ser. No. 15/822,522, filed Nov. 27, 2017, which claims the benefit of and priority to U.S. Provisional Application No. 62/426,727, filed Nov. 28, 2016, and U.S. Provisional Application No. 62/550,839, filed Aug. 28, 2017, each of which are hereby incorporated by reference in their entireties.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools finding documents that are similar to a reference. Previously, in order to find documents of interest, researchers were required to carefully craft search strategies for obtaining the information sought. In many cases, substantial skill and experience on the part of the researcher were needed in order to craft a search that would successfully and efficiently obtain the information sought. For example, a researcher's experience with information classification systems and even fore-knowledge of a document's exact contents were sometimes required in order to find some documents.

At a basic level, one previous approach for finding documents provided a word search in which a user can search for all documents containing a certain word or phrase. The results may be filtered or otherwise restricted (e.g., by date, author, county of origin, etc.) to yield a result set. More advanced searches were possible using Boolean and other operators, but still these searches required skill and/or advanced knowledge of the documents sought in order to be successful.

Other previous approaches took the basic word search a step further by performing an initial analysis of documents available for searching to identify a relative importance of words or topics relating to the documents. For example, documents ingested into a research collection or library may be analyzed to produce a vector space model for each document representing the relative importance of various index terms that are related to the document. A particular example is the term frequency-inverse document frequency model ("tf-idf"). Subsequent word searches produce results based on the predetermined importance of search terms within result documents. In other examples, conceptual topics are identified in documents (manually and/or through the use of computer software) and searches may be performed on the previously identified topics or the topics may be browsed.

However, there still remains a need for a system and method for finding documents based on semantic similarity between the documents. The new tools for finding documents in this manner presented herein improve access to such documents, make searching for documents that are similar to a reference quicker, more efficient, less prone to error and yield a more comprehensive, yet more precisely targeted result set of documents than was previously possible.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present invention provides a system and method for finding and retrieving documents that are similar to a reference, and in particular where the similarity is determined based at least in part on the semantic similarity of facts present in both.

In one aspect, a method for finding documents comprises ingesting at least two library documents by extracting and indexing library triples therefrom, receiving a reference text string, extracting at least one reference triple from the reference text string, identifying one or more library triples similar to the at least one reference triple, and returning a list of one or more result library documents based on the identified library triples.

In some implementations, the method further comprises expanding the library triples based on a semantic corpus to obtain expanded library triples and indexing the expanded library triples while maintaining a record of the library document from which the library triples used to obtain them were extracted, wherein the identifying step includes identifying one or more expanded library triples similar to the at least one reference triple and the list of one or more result library documents returned by the returning step is based on the identified library triples and expanded library triples.

In other implementations, the method further comprises expanding the at least one reference triple based on a semantic corpus to obtain at least one expanded reference triple, wherein the identifying step includes identifying one or more library triples similar to the at least one expanded reference triple.

In other implementations, the the expanding step includes forming multi-word tokens as components of a library triple based on a semantic corpus.

In other implementations, the expanding step includes forming multi-word tokens as components of a reference triple based on a semantic corpus.

In other implementations, the returned list is ranked based on a similarity between the identified library triples in each listed library document and the one or more reference triples.

In other implementations, the method further comprises scoring library documents from which identified library triples were extracted based on an aggregation of similarity scores between each identified library triple and its corresponding reference triple.

In other implementations, the list that is returned includes only library documents having a similarity score above a predefined threshold.

In other implementations, the listed library documents are ranked according to their similarity scores.

In other implementations, the method further comprises receiving a second reference text string after returning the list, extracting at least one second reference triple from the second reference text string, identifying one or more library triples similar to the at least one second reference triple, and returning an updated list of one or more result library reference documents based on the library triples identified with respect to both the first reference triples and second reference triples.

In another aspect, a method for mining facts from a body of documents, comprises ingesting two or more library documents by extracting and indexing library triples therefrom that relate to a primary source, grouping similar triples into one or more fact groups, ingesting a later document after the two or more library documents by extracting later triples therefrom that relate to a primary source, and grouping the later triples into the one or more fact groups based on a similarity between the later triples and the library triples previously comprising the one or more fact groups.

In some implementations, the method further comprises receiving a reference text string, extracting at least one reference triple from the reference text string, expanding the at least one reference triple based on the one or more fact groups to obtain at least one expanded reference triple, identifying one or more library triples similar to the at least one expanded reference triple, and returning a list of one or more result library documents based on the identified library triples.

In other implementations, the method further comprises receiving a reference text string, extracting at least one reference triple from the reference text string, expanding the at least one reference triple based on the one or more fact groups to obtain at least one expanded reference triple, identifying one or more library triples similar to the at least one expanded reference triple, and returning a list of one or more primary sources based on the identified library triples.

In another aspect, a method for finding documents relating to a primary source comprises ingesting two or more library documents by extracting and indexing library triples therefrom that relate to a primary source, receiving a reference text string, extracting at least one reference triple from the reference text string, identifying one or more library triples similar to the at least one reference triple, and returning a list of one or more primary sources based on the identified library triples.

In another aspect, a measure of similarity between two documents based on a combination of one or more of the semantic similarity between the different components of the facts that are extracted from each document, the sequence of the facts in both documents and how much they agree on, the semantic similarity between sentences in both documents, other metadata that describe the documents such as their topics and references to other documents and/or authorities, and/or the weights of each of these factors, determined by the user, to reflect their significance, which results in adjusting the overall similarity score of a given document.

In some implementations, the method further comprises optimizing the search process to avoid computing the similarity to each document in the document collection by indexing the semantically expanded facts from the document collection and scoring and/or ranking the results from the index lookups to compute an overall relevance score for each document and present the results ordered accordingly.

In another aspect, a new search workflow is implemented as a browser extension allowing for seamless integration of the search functionality without leaving the current document context. Search results may be displayed in the browser extension window to overlay the current context without disrupting it.

In another aspect, a new interactive search workflow where users enter facts or statements line by line and the results view is updated automatically in real-time to show the documents that are most relevant to the current list of statements.

In another aspect, a system and method for mining facts that are extracted from a collection of legal documents comprises extracting and mining facts from documents that cite a particular law, grouping similar facts into fact groups according to their semantic similarity and treating a fact group as a single item in the mining process, and utilizing the overall frequency of mentions of a fact in the whole corpus to avoid generating generally popular facts as relevant.

In another aspect, a new method for semantically expanding terms in search queries is guided by the dataset generated as described above to restrict and guide the expansion only to semantically similar terms that are related to the same legislation, and hence, have similar legal implications. For example, search queries comprise mainly of facts to be searched, facts in a search query are matched against the dataset to find most relevant laws, retrieving the matched conceptual fact groups to use for expansion, and the terms of a fact are expanded utilizing other facts in the matched conceptual fact groups that: (a) mention the same law; (b) are most relevant to the fact in the search query; and (c) are most relevant to the target law.

In some implementations, the method further comprises extracting facts from the search query text and using them to query the dataset to find relevant laws and the retrieved laws are ranked according to aggregating the score of their relevance to the facts in the search query.

BRIEF DESCRIPTION OF THE DRAWINGS

The accompanying drawings illustrate various non-limiting, example, innovative aspects in accordance with the present descriptions:

FIGS. 7-10 are screenshots illustrating exemplary applications of the present system and method;

DETAILED DESCRIPTION

Figure 1:
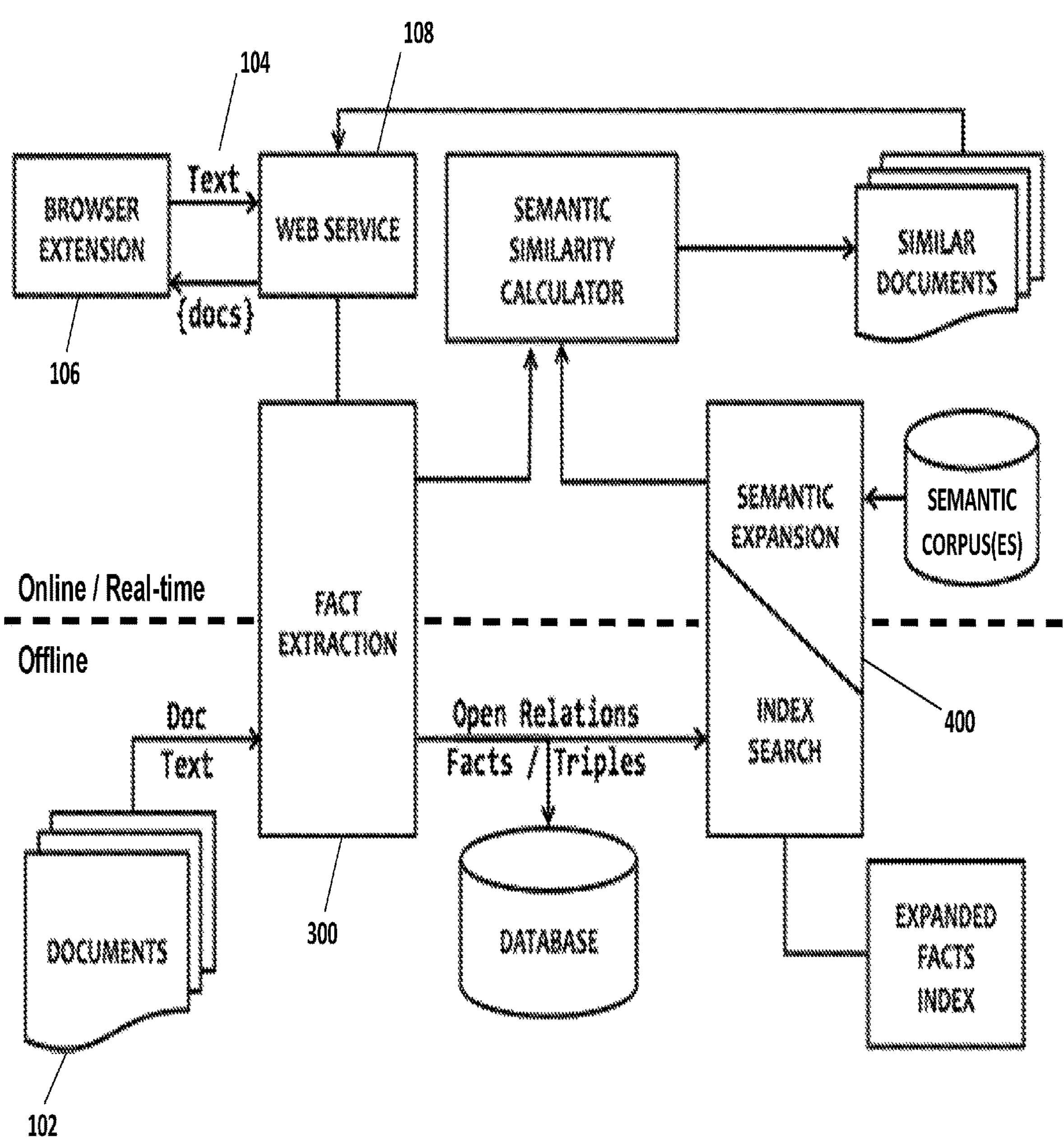
FIG. 1 is a schematic diagram illustrating the high-level architecture of how one embodiment of an exemplary system may be implemented.

Embodiments of systems and methods for finding similar documents based on semantic factual similarity are described herein. While aspects of the described systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of using computers to find similar documents based on semantic factual similarity. These improvements not only improve the functioning of how such a computer (or any number of computers employed in a search for similar documents) is able to operate to serve the user's research goals, but also improves the accuracy, efficiency and usefulness of the search results that are returned to the searcher. The inventive search tools described herein generally are configured to receive a reference text from a user and to compare the reference text to the text of cataloged documents to find similar documents to the reference text. The comparison may be accomplished by, for example, extracting, expanding and indexing facts from documents to be catalogued and comparing these against facts extracted and expanded from the reference texts input by users.

The tools described herein are particularly suited to legal documents and research and are generally discussed in that context, however it will be appreciated that many other types of documents, research and researchers will benefit from the inventive tools disclosed and claimed herein.

One of the goals of legal research is to find precedents. In common law, judges use precedents such as past decisions to guide their current decisions. Lawyers also use precedents to support their arguments or build case strategies, among other tasks.

Finding legal precedents is one example of an application of the systems and methods described herein in which a goal is to find relevant cases with similar facts to a present situation. In an exemplary process, the semantic factual similarity measure described herein is used as a tool to enable legal researchers to find precedents.

FIG. 1 is a schematic diagram illustrating the high-level architecture of how one embodiment of an exemplary system may be implemented. It shows the different system components and the operations that may be done in the preprocessing phase (offline) and at runtime (online). Of course, various tasks may also be performed at any time or continuously. For example, new documents 102 may be ingested at the same time or after a user enters a reference text 104 through their browser extension 106 in online operation. In one example, a search operation is exposed via a web service 108 that can be accessed and interacted with remotely, e.g., through a browser extension. For example, a browser extension may be configured to serve as a remote web client that performs HTTP GET/POST operations to a REST web service that is hosted and provided by a server.

Figure 2:
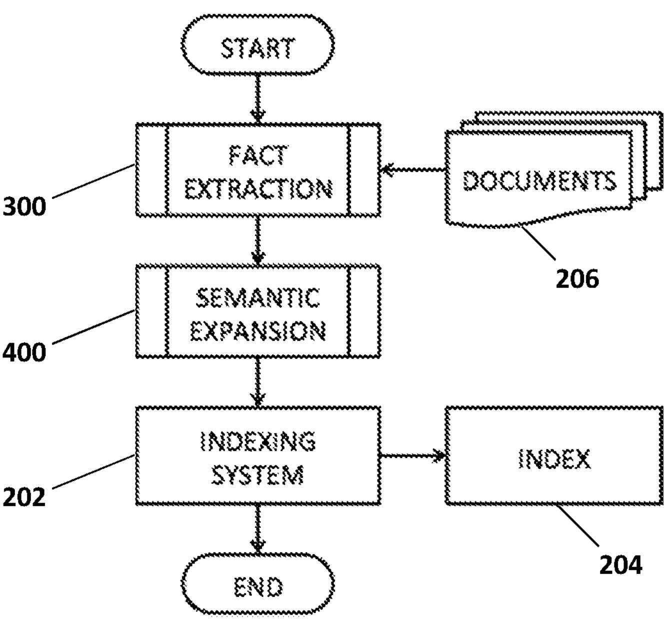
FIG. 2 is a flow chart that shows an exemplary embodiment of preprocessing which may run offline.

FIG. 2 shows an exemplary embodiment of preprocessing which may run offline. The goal of this process is to build 202 an index 204 on the semantically expanded 400 facts that are extracted 300 from ingested documents 206.

Figure 3:
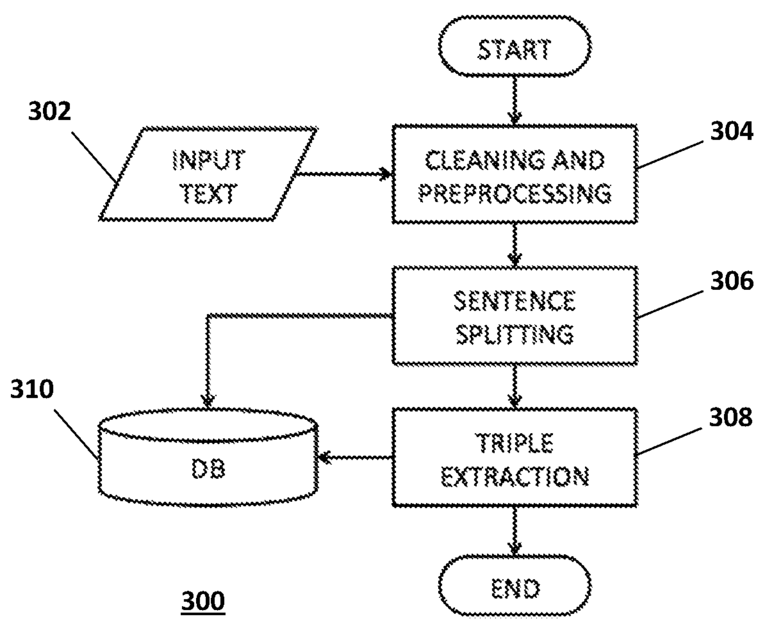
FIG. 3 is a flow chart that shows an exemplary embodiment of a fact extraction process or module such as those depicted in FIGS. 1 and 2.

FIG. 3 shows an exemplary embodiment of a fact extraction process or module 300 such as those depicted in FIGS. 1 and 2. The extraction module may be configured to receive an input text 302, clean it (e.g., to remove tags and headers) 304 and split it into sentences 306. In one example, full case documents may be retrieved from Westlaw (a legal research service). In this example, cleaning and preprocessing may include isolating the body of a case from the document. Each sentence may then be sent to a triple extraction process or module 308, which may be configured to analyze the structure of the sentence (e.g., attach part-of-speech tags) and produce generic triples in the format subject-predicate-object based on the structure of the sentence. The extracted sentences and triples ("facts") may then be stored in a database 310 for later analysis. The database may retain a record of the provenance or source (e.g., a source document or a location within a source document) of each sentence and triple for later analysis.

Figure 4:
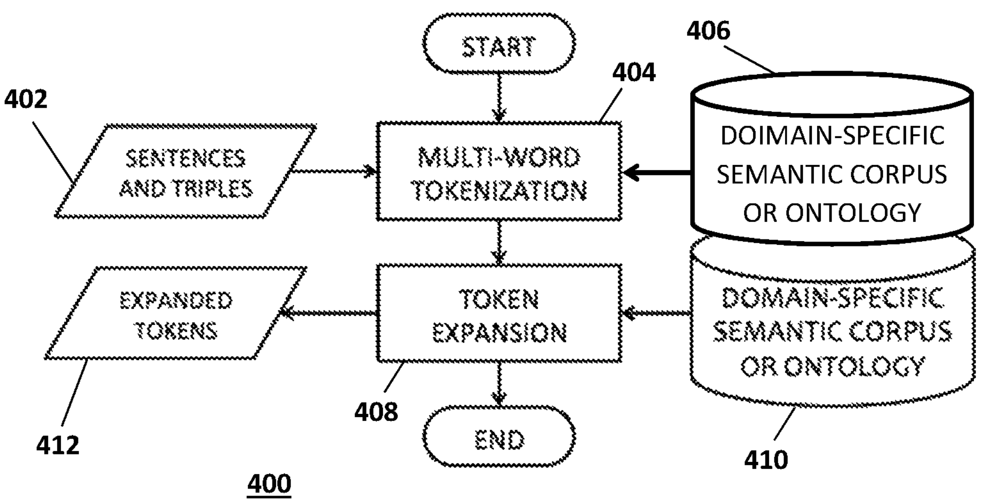
FIG. 4 is a flow chart that describes in more detail the process of expanding facts semantically.

FIG. 4 describes in more detail the process of expanding facts semantically. This segment of the process is intended to ensure that the semantics of the facts are captured regardless of how they are expressed in the text. The semantic expansion module 400 expands the extracted facts.

The semantic expansion process 400 that takes the extracted sentences and triples as input 402 and tokenizes 404 the text of their components (e.g., of the subject, predicate, or object) into multiple-word tokens whenever valid. The multi-word tokenization 404 determines the permissible combination of words to preserve the original meaning because the meaning of each separate word might be different from the meaning of the multi-word combination. This is done by looking up candidate multi-word combinations in a domain-specific semantic corpus, ontology, dictionary or thesaurus 406. An example of such an external semantic corpus 406 may be built by analyzing large text collections or other (domain-specific) ontologies that are manually curated to control the expansion of tokens.

Each component of the extracted triples and sentences (subjects, predicates, objects, and multi-word tokens) are then expanded 408 using the same or different domain-specific corpus 410 to produce synonyms, hypernyms and other similar words (expanded tokens) 412. These expanded facts and sentences may then be indexed to allow search and analytics on this expanded data.

Figure 6:
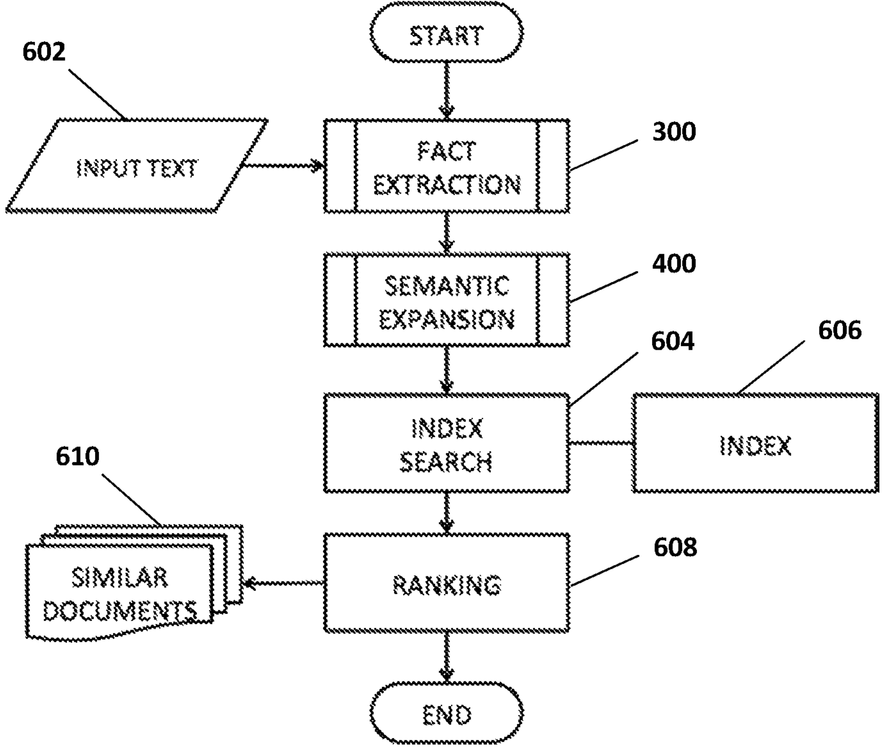
FIG. 6 is a flow chart that shows an online or real-time phase in which the present system and method can be used to find documents that are similar to a particular reference document or snippet of text.

In an online or real-time phase, shown generally in FIG. 6, the present system and method can be used to find documents that are similar to a particular reference document or snippet of text. Given the input reference text 602, the fact extraction 300 produces a set of triples present in the reference text as described in FIG. 3 which are fed to the semantic expansion process 400 to find related terms, just as with the ingested documents as described above with reference to FIG. 4. The expanded facts 412 are then used to search 604 in the pre-built index 606, and the results of the search may then be aggregated to filter, rank and score 608 the retrieved documents and then the results 610 are returned accordingly.

Figure 7:
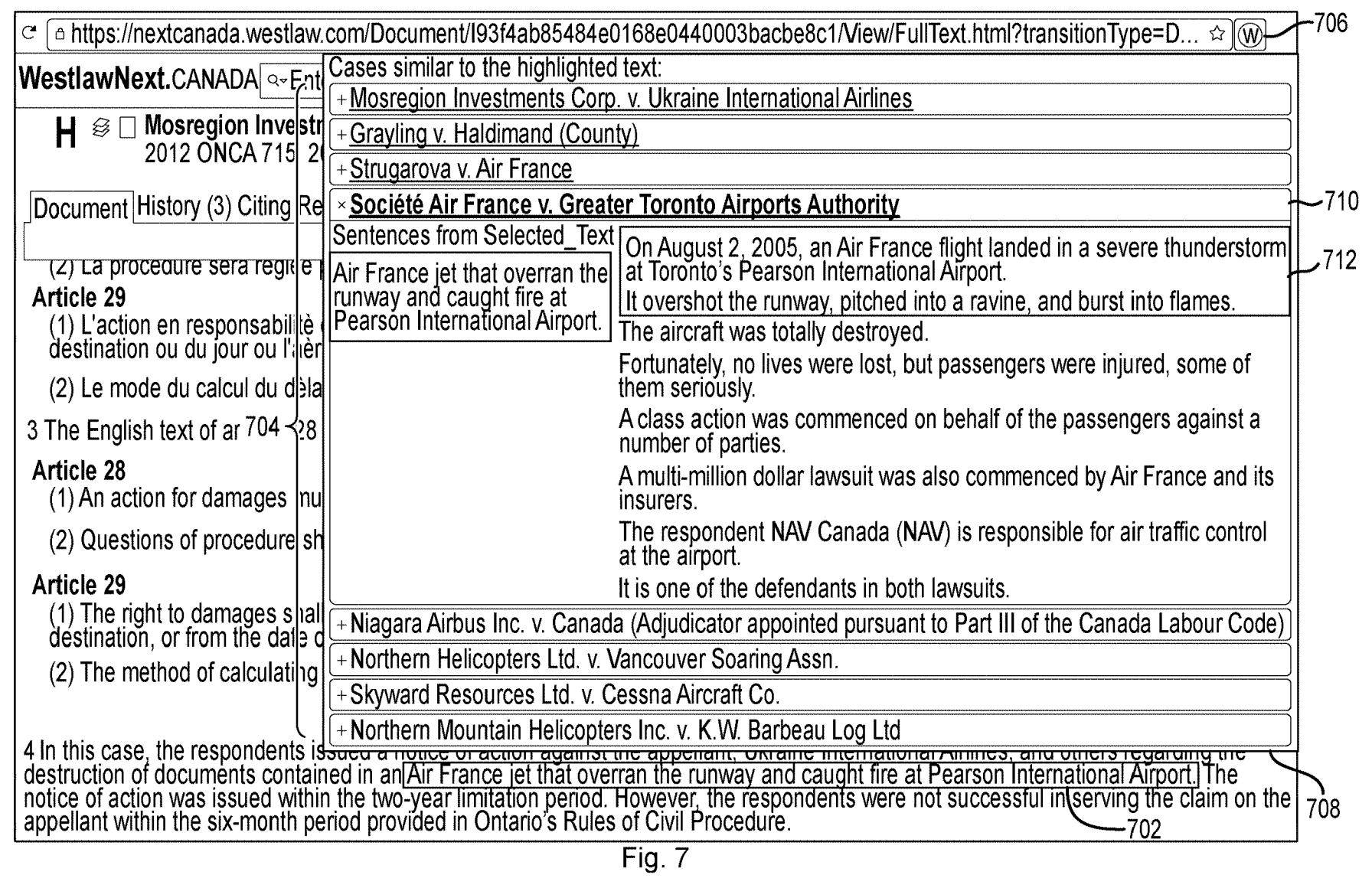

FIGS. 7-10 illustrate an exemplary application of the present system and method. In FIG. 7, a user may select a phrase of interest 702 from a reference document ("Air France jet that overran the runway and caught fire at Pearson International Airport") and be presented with a list of result documents 704 that are similar to the selected text, the similarity being determined by a comparison of the extracted and expanded facts from the reference text and the potentially relevant, previously ingested documents. The search may be integrated into a browser extension to allow for seamless integration with a user's research workflow without interrupting the current context. For example, a user may highlight the text of interest in their browser window and click on a browser extension icon 706 to cause a similar result documents to be displayed in an extension window 708 ranked by their relevance.

In the example shown in FIG. 7, the selected text 702 may be processed to extract the following triples:

| Subject | Predicate | Object |
|---|---|---|
| Air France jet | overrun | runway |
| Air France jet | catch | fire |
| Air France jet | catch fire at | Pearson International Airport |

In an exemplary expansion process, the tokens in the extracted triples may be normalized to their base forms using stemming and lemmatization techniques (e.g., "caught" is changed to "catch"). The tokens of each component of the triples are then expanded semantically using the same corpus that was used in the offline process. Taking the second triple as an example, the triple object "fire" is expanded to ["ignite", "flame", "explosion", "gunfire", "machine gun", . . . ] and the predicate "catch" is expanded to ["capture", ", find", "chase", "bait", "arrest", "stop", . . . ]. These terms are grouped according to their relation to the original tokens.

Given the extracted triples and sentences and their expanded tokens, the next step is the semantic similarity calculation. The expanded triples are used to query the pre-built index to find other similar triples in the index. Different fields of a triple and its expansions are used in multiple queries with different weights, which weights may be customizable by the user or may be adaptively set based on current or prior use of the particular user or of a group of (or all) users. The retrieved triples may be weighted according to which fields matched and how similar they are. Again, the weighting may be customizable by the user or may be adaptively set based on current or prior use of the particular user or of a group of (or all) users. The results are then aggregated and may be ranked according to multiple factors including their relevance scores and weights of the matched fields. This cumulative relevance score may be used to rank the retrieved case documents.

In one particular non-limiting example, the triples extracted and/or expanded from the reference text (reference triples) are compared to indexed triples that were previously extracted and/or expanded from the cataloged library of potential result documents (result triples) and a similarity score is tabulated between pairs of similar triples. For example, reference triple A may be determined to be 30% similar to result triple Y and 80% similar to result triple Z. Next, all result documents containing result triple Y or Z are identified and a similarity score for each result document is calculated based on the presence and/or prevalence of result triples Y and/or Z in the result documents. If more than one reference triple is extracted and/or expanded from the reference text, result documents are again identified and scored in a like fashion for each reference triple and document similarity scores may be aggregated for all reference triples. The aggregated document similarity scores may be used to rank and/or filter the result documents returned to the user.

User-settable weights for the similarity scoring include but are not limited to the semantic similarity between the different components of the facts that are extracted from a reference and a library document, the sequence of the facts in a reference and a library document and how much they agree on, the semantic similarity between sentences in a reference and a library document, as well as other metadata that describe the reference or the library document such as their topics and references to other documents and/or authorities.

As shown in FIG. 7, the retrieved result documents may be displayed by the browser extension as a list ordered according to their relevance scores. The user can expand a particular document listing 710 to show the reasoning for the inclusion of this document in the results, i.e., explain what makes the document similar to the selected text by highlighting the similar sentences 712 that contain related facts.

Figure 8:
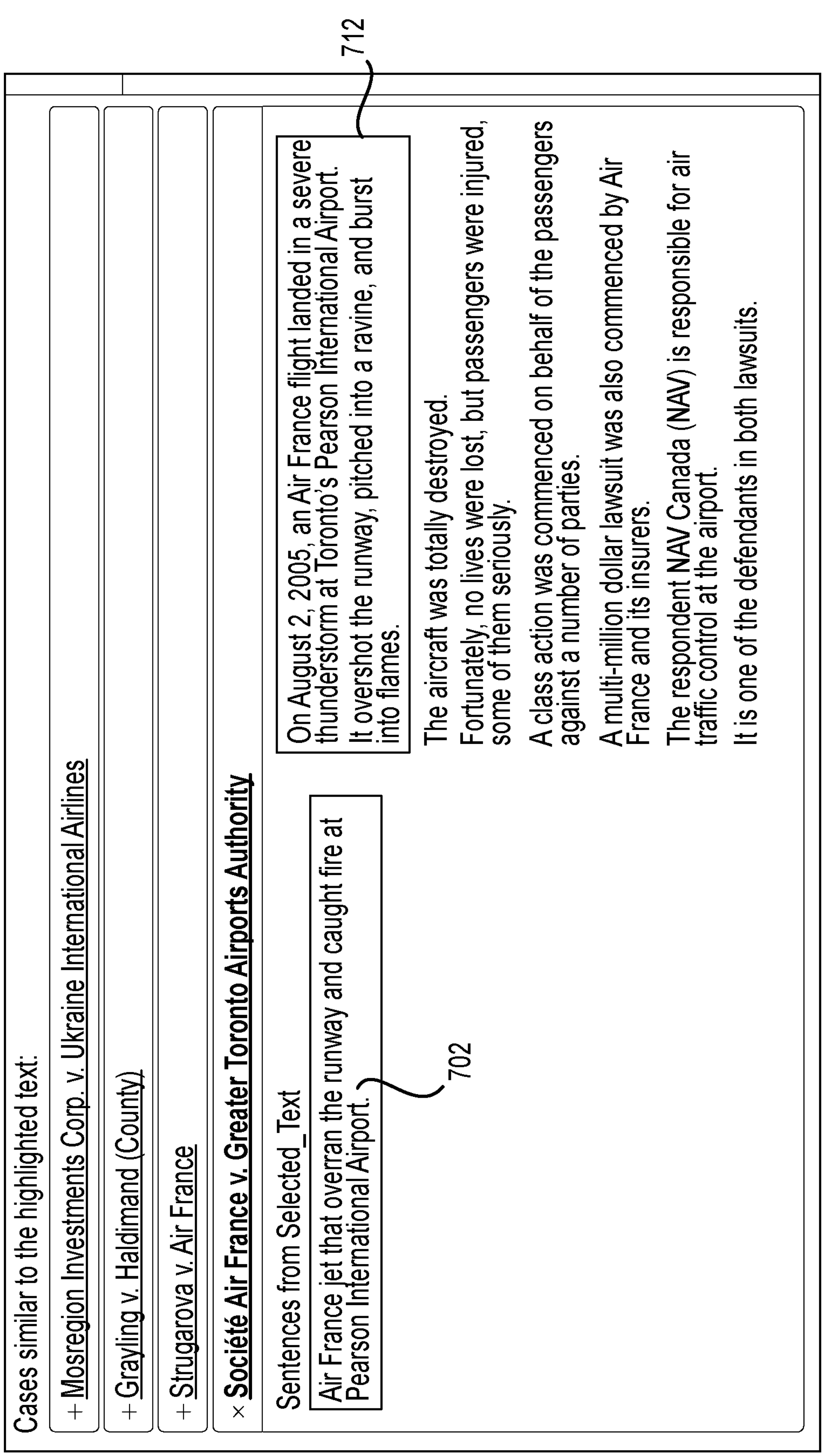

FIG. 8 shows a list of result documents. As discussed above, users are provided with the functionality to expand a document item to explain why it is deemed similar to the highlighted reference text. Matching sentences from both the selected reference text 702 and the result document 712 may be highlighted in different colors.

For example, FIG. 8 shows that the highlighted sentence "Air France jet overran the runway and caught fire at Pearson International Airport" 702 is similar to the two sentences "On Aug. 2, 2005 an Air France flight landed in a severe thunderstorm at Toronto's Pearson International Airport." and "It overshot the runway, pitched into a ravine, and burst into flames." 712 The first sentence is related to the fact that the case discusses an Air France flight that landed in Toronto Pearson International Airport, while the second sentence is related to the fact that the aircraft overran the runway and was consumed by fire. The second sentence depicts how the semantic similarity aspect of the presented invention captures the similarity between "caught fire" and "burst into flames". The two phrases describe a similar concept even though they are expressed in different ways.

Figure 9:
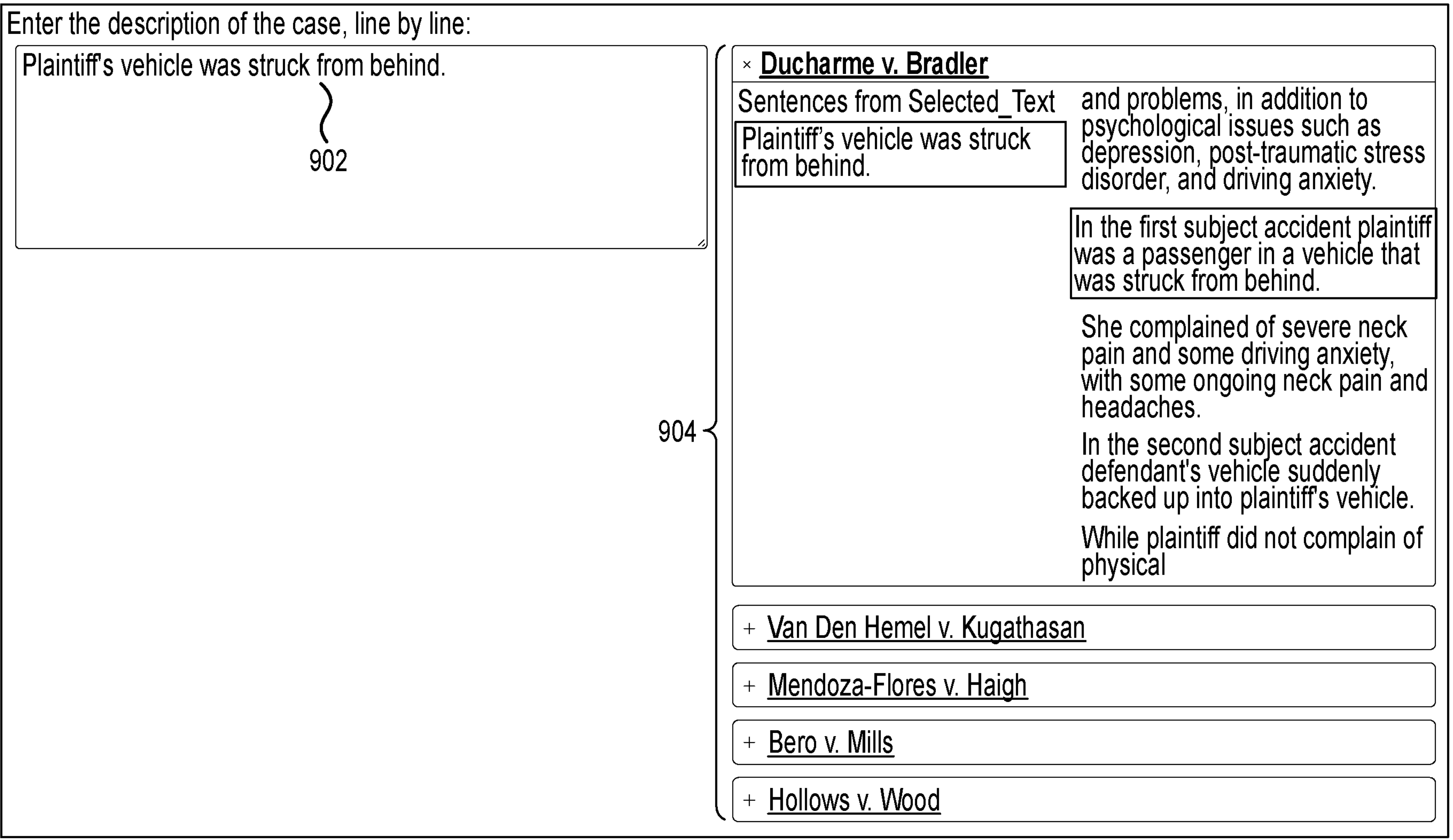

In another exemplary input method, shown generally in FIG. 9, a researcher may interactively and dynamically enter or remove reference text 902 while result documents are concurrently identified and displayed in an adjacent result window 904. For example, as a researcher enters the facts of a case (or a potential case to be litigated) line by line, the system shows a list of similar cases that are updated as the researcher enters more details. Each piece of added information (e.g., word, triplet, sentence, line) may be used to issue new search queries to refine the search results and re-rank the retrieved cases to better match the new input. Similarly, if reference text is removed, the search and ranking may be redone at any interval during or after removal to refocus the results on the remainder of the reference text.

Figure 10:
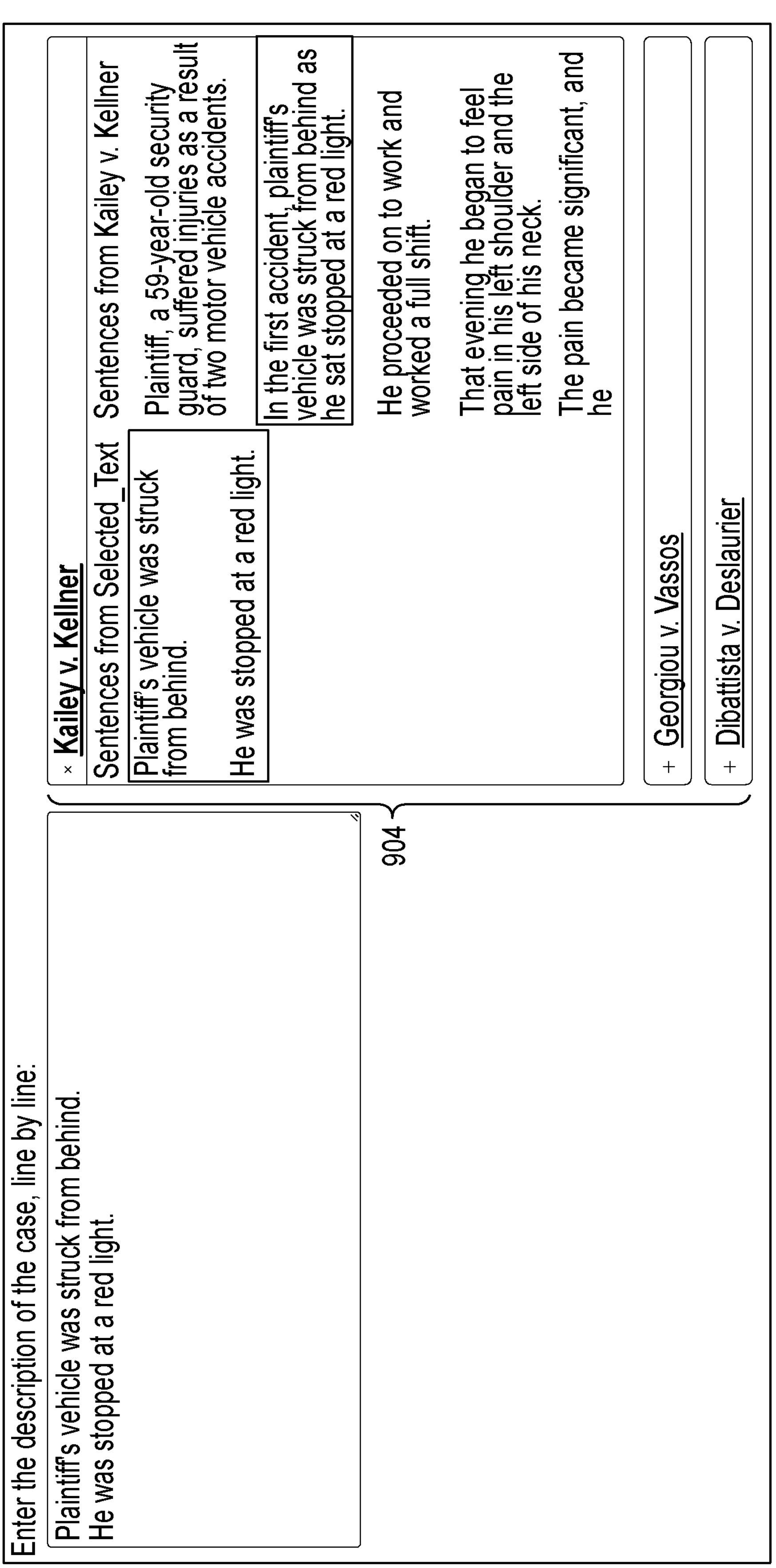

FIG. 10 shows an updated view of FIG. 9 as the user adds another sentence. The list of relevant documents 904 is automatically updated to match the new input, which is reflected in the similarity between the input text and the top-relevant case. This usage allows for an exploratory and interactive approach of finding relevant documents.

In another embodiment, the present system and method may be adapted for particular use in a context involving a set of core documents and a set of subordinate documents that relate to and cite the core documents. One such context is present in the legal field, involving legislative documents such as laws, codes, etc. (core documents) that are interpreted, applied, argued over, and cited by subordinate documents such as case decisions, legal briefs, secondary sources, etc. (subordinate documents). By examining the facts in the subordinate documents citing the core documents, a map may be built and exploited between facts (derived from the subordinate documents) and particular portions of the core documents (e.g., a particular statute).

For example, the present disclosure provides a new system and method for mining facts from a collection of legal documents to find sets of semantically similar facts that are most relevant to laws. Facts may be mined pivoted around citations to different laws and legislations that are cited in the same legal document in which the facts appear. The present system and method may be configured to produce a dataset that maps each law to a list of facts that are sorted according to their relevance to the law and their frequency of mentions in the cases that cite it.

It is one objective of the present disclosure to use the generated dataset in guiding the query expansion when searching for documents in a corpus of legal documents. The dataset is used to restrict and guide the semantic expansion of fact terms to other terms that are semantically similar to the original terms and are related to the same legislation, i.e., have similar legal implications.

It is another objective of the present disclosure to utilize the generated dataset to search for the laws that are most relevant to a specific case based on the facts that are extracted from the case and querying the generated dataset.

The mining process may be configured to produce a dataset that contains laws and a set of facts most relevant to the laws. This method is focused on the legal domain where legal documents cite related laws, i.e., the fact mining operation is pivoted around the laws that are cited across a collection of legal documents. The end goal is to use this dataset to control and guide the semantic expansion of the facts that appear in a search query to other terms that are both semantically similar and follow the same laws, and accordingly have the same legal implications. This produces a legislation-aware semantic expansion as opposed to the general purpose semantic expansion that relies on the linguistic semantics of a term.

Two exemplary applications are described where the generated dataset can be utilized. However, these example applications do not encompass all possible applications of this technology, but are used as a reference for describing the content of the generated dataset and how it can power downstream applications.

There are two main types of sources of legal documents: primary sources and secondary sources. Primary sources include statements of the law, such as court decisions, statutes, and legislative bills. Secondary sources are materials that interpret a legislation or a statute, explain or discuss legal issues, or analyze the laws. Examples of secondary sources are law reviews, legal news, books about law, encyclopedias, and legal memoranda. They provide extensive citations to primary sources and give summaries and conclusions about different legal issues.

Laws and statutes describe the legislation relating to a particular subject matter and they are interpreted and applied by courts and judges as they rule in particular factual scenarios. The text of a legislation itself states some rules that should be followed or should not be broken. When a legal document (e.g., a case decision or a memorandum) cites a statute, it is because there is a legal issue that is relevant to the rules of the cited statute. The documents that cite a specific legislation usually contain facts that are related to that legislation.

The present invention may be configured to extract and mine facts from the legal documents that cite legislations in order to find facts that appear frequently in these documents and use this as an identifier of a set of legislation-related facts that are relevant to a particular legislation.

Figure 11:
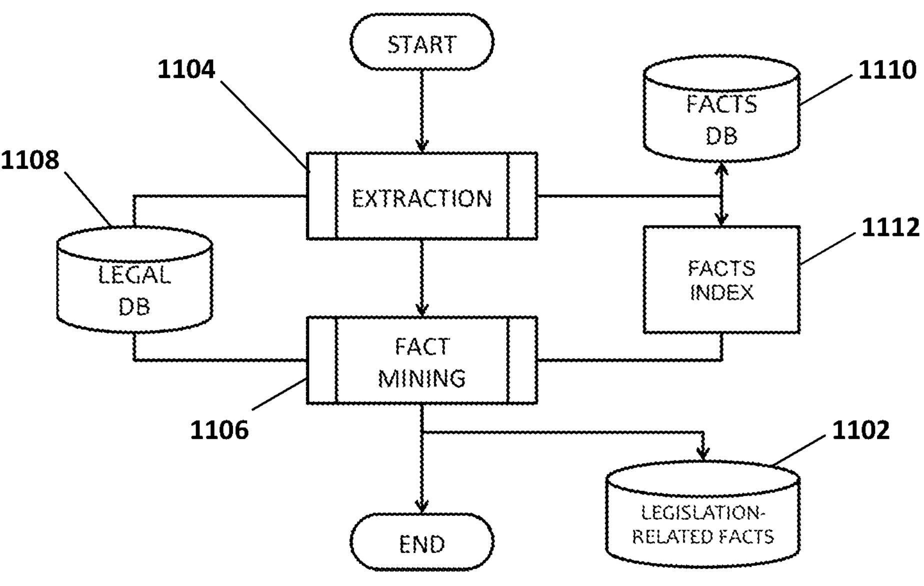
FIG. 11 is a schematic diagram illustrating an exemplary overview of a process that generates a target dataset.
Figure 16:
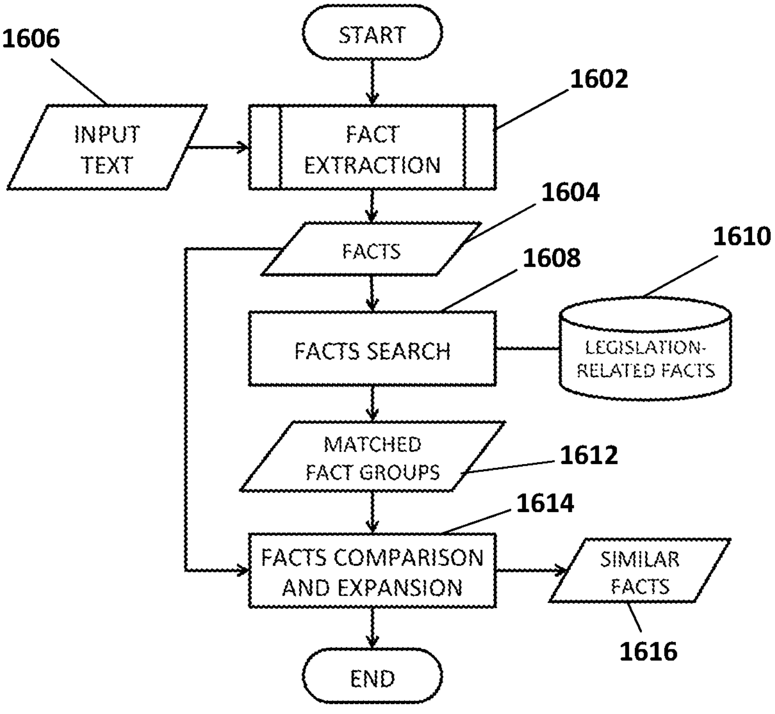
FIG. 16 is a flow chart that illustrates an exemplary process of semantically expanding fact terms.
Figure 17:
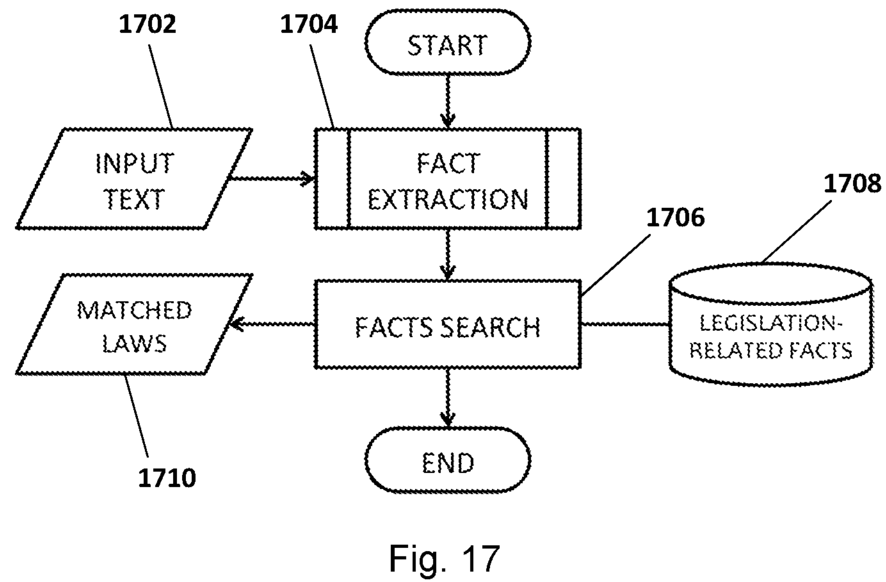
FIG. 17 is a flow chart that illustrates an exemplary application utilizing a legislation-related fact dataset to find relevant laws and statutes that apply to an input fact scenario.

FIG. 11 is a schematic diagram illustrating an exemplary overview of the process that generates a target dataset (i.e., Legislation-Related Facts 1102). From a high-level, the process is divided into extraction 1104 and fact mining 1106. The legal database 1108 contains a collection of legal documents of different types (e.g., legal memoranda, encyclopedias, and cases) and is also used to store the citations between documents. The facts database 1110 stores the facts that are extracted from the documents, and the facts are also indexed in a facts index 1112. FIGS. 16 and 17 explain how downstream applications utilize this dataset.

The fact mining process may be configured to run in an offline phase to generate the target dataset of legislations and relevant facts. Of course, as described with reference to the embodiment of FIG. 1, such "offline" processes may be conducted at any time, including during and after a user invokes the system to begin a search.

Figure 12:
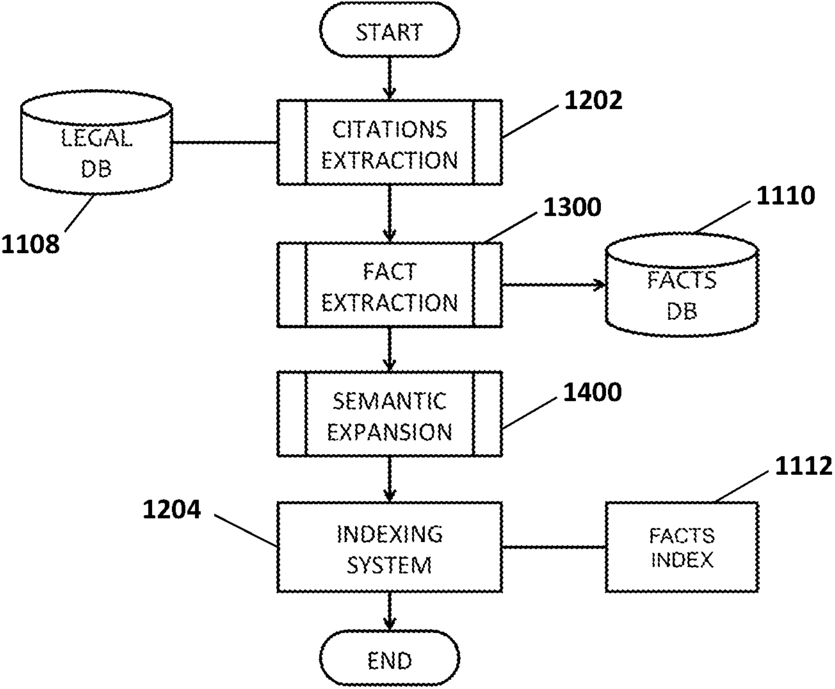
FIG. 12 is a flow chart that illustrates an exemplary extraction process according to an exemplary embodiment.

The extraction process runs on the ingested legal documents that are stored in the Legal DB 1108. The goal of the extraction process that is depicted in FIG. 12 is two-fold: identifying citations of laws in the documents and extracting facts from the text of the documents.

The citation extraction process 1202 identifies mentions of laws, statutes, and legislations in general. For example, the system may be configured to employ one or more Natural Language Processing tools that combine expert-defined rules with machine learning techniques to detect mentions of laws (citations) in the text. Optionally, there is a human-based post-processing phase that is done by experienced content editors to verify the correctness of the extracted content and generate high quality data. Facts may also be extracted 1300 as described below with reference to FIG. 13 and the extraction results may be populated in the database. The extracted facts may be semantically expanded 1400 as described below with reference to FIG. 14 and the semantically expanded facts may be indexed 1204 in an inverted index 1112 to enable efficient search.

Figure 13:
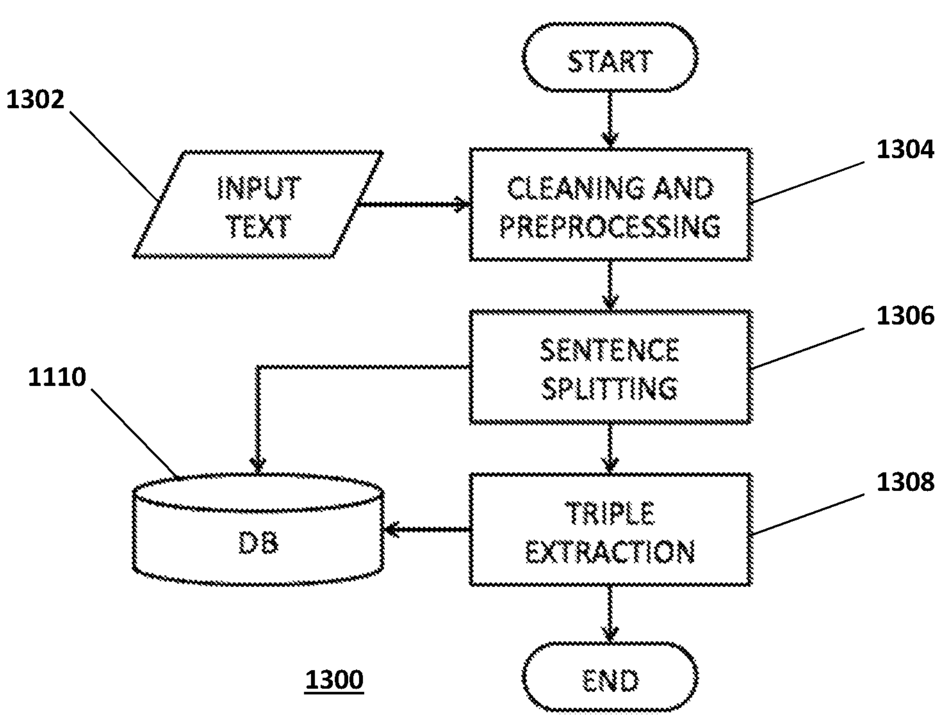
FIG. 13 is a flow chart that illustrates an exemplary flow of a fact extraction process.

FIG. 13 describes an exemplary flow of a fact extraction process 1300. The text body 1302 of a document is extracted, pre-processed, and cleaned 1304 (e.g., to remove tags and headers) in preparation for extraction. The text is split into sentences 1306. Using a triple extraction module 1308, facts in the form of triples are extracted from sentences, where each sentence can produce multiples triples. The triples are in the format (subject, predicate, object). These triples are stored in a database 1110 for further analysis and to maintain the provenance of facts.

To further explain the output of the fact extraction process, consider the following snippets of text that are retrieved from multiple legal documents including court decisions and legal memoranda. Shown below is a sample output of the fact extraction results and later refer to the extracted triples to explain the mining process. Each table contains the processed snippet of text and the triples (subject, predicate, object) that were extracted from it. The left column includes an ID of the snippet and IDs of the extracted triples to refer to them later.

| | | | |
|---|---|---|---|
| S1 | "The plaintiff was a passenger on the motorcycle driven by her husband, the defendant, when the motorcycle collided with a deer." | | |
| t1 | plaintiff | be | passenger |
| t2 | plaintiff | be a passenger on | motorcycle |
| t3 | motorcycle | drive by | she husband |
| t4 | motorcycle | collide with | deer |

| | | | |
|---|---|---|---|
| S2 | "There was no traffic in the area when the vehicle hit the moose" | | |
| t5 | there | be | no traffic |
| t6 | there | be no traffic | in the area |
| t7 | vehicle | hit | moose |

| | | | |
|---|---|---|---|
| S3 | "The truck admittedly struck a deer" | | |
| t8 | truck | strike | deer |

| | | | |
|---|---|---|---|
| S4 | "The left front corner of the truck struck the deer, propelling it towards the west shoulder." | | |
| t9 | truck | have | left front corner |
| t10 | truck | strike | deer |
| t11 | left front corner of the truck | strike | deer |

The tokens in the extracted triples may be normalized to their base forms using stemming and lemmatization techniques (e.g., "struck" is changed to "strike").

Figure 14:
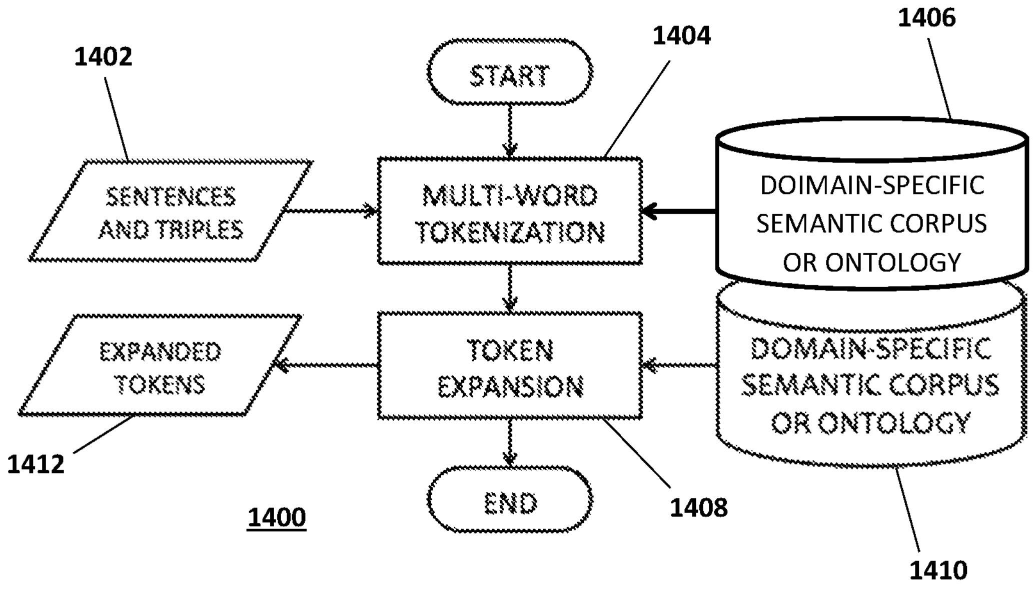
FIG. 14 is a flow chart that depicts an exemplary process of expanding facts semantically.

The semantic expansion module expands the extracted triples. FIG. 14 describes in more detail an exemplary process 1400 of expanding facts 1402 semantically. The multi-word tokenization 1404 determines the correct combination of words to preserve their meaning because the meaning of each separate word might be different from the meaning of the multi-word combination. This may be done by looking up candidate multi-word combinations in a domain-specific semantic corpus, ontology, dictionary or thesaurus 1406. Such an external semantic corpus may be built by analyzing large text collections or other (domain-specific) ontologies that are manually curated to control the expansion of tokens. Each component of the extracted triples and sentences (subjects, predicates, objects, and multi-word tokens) may then be expanded 1408 using the same or different domain-specific corpus 1410 to produce synonyms, hypernyms and other similar words (expanded tokens) 1412. These expanded facts and sentences are then indexed to allow search and analytics on this data.

After preprocessing all documents to identify citations of legislation or other primary sources, extract fact triples and, index facts, the mining process may be applied to the extracted and indexed data. The fact mining module may be configured to implement frequent itemset mining algorithms, for example where a database transaction that contains items corresponds to a legal document that contains facts and the items correspond to extracted facts. However, the goal is to group semantically similar facts together as a single item called a fact group. Therefore, one may choose not to rely on mere equality between facts. Instead of calculating the frequency of equal (identical) facts, one may calculate the support of a fact group. This requires constructing fact groups that contain semantically similar facts.

In order to mine facts that are related to a particular legislation, simple scoping 1502 and filtering 1504 processes may be applied first to identify facts that were extracted from the legal documents that cite the particular legislation. This limits the set of facts to those relevant to a user's current line of inquiry. In the example discussed herein and with respect to the figures, it is assumed that all extracted facts are relevant for the mining process.

Figure 15:
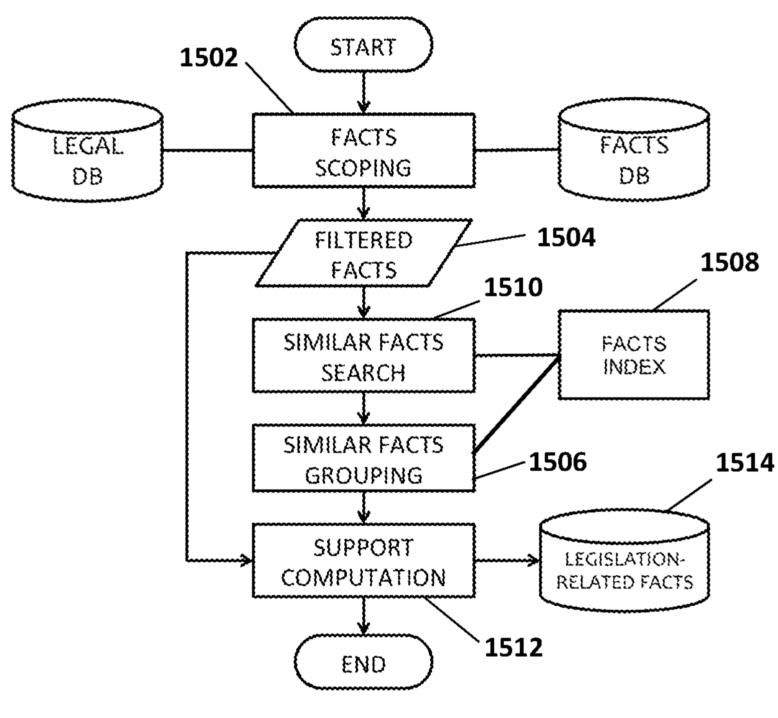
FIG. 15 is a flow chart that illustrates an exemplary fact mining process according to an exemplary embodiment.

The process of fact mining (shown generally in FIG. 15) may include grouping facts 1506 into groups that contain semantically similar facts. Comparing facts to one another may not scale. Therefore, a facts index 1508 may be used to find facts that are most similar 1510 to a particular fact. As a part of the fact grouping process 1506, the input facts to be grouped may be scanned. For each fact, a check may be conducted to determine if there is a fact group that is already constructed and contains that fact. If no matching groups are found, a search may be conducted of the facts index to find the most semantically similar facts based on the terms in the original fact and the semantically expanded and indexed terms in the facts index 1508. A fact group may then be constructed from the returned results for all the facts that have a relevance score that is above a user-defined threshold. It is possible that this grouping mechanism may produce redundant groups, in which case redundant groups that have substantially common facts may be merged.

Continuing on the present example, each extracted fact from t1 to t11 may be examined to search for the most relevant facts, constructing a fact group from the retrieved results, unless the fact is already used in one of the pre-constructed fact groups. For example, using t1 and t4 as queries, the following two fact groups FG1 and FG2 may constructed:

| | | | |
|---|---|---|---|
| FG1 | plaintiff | be | passenger |
| | plaintiff | be a passenger on | motorcycle |

| | | | |
|---|---|---|---|
| FG2 | motorcycle | collide with | deer |
| | vehicle | hit | moose |
| | truck | strike | deer |

The next step is computing the support 1512 for each fact group. The original facts may be scanned again, and the support (frequency of mentions) of all the fact groups that the current fact belongs to maybe incremented again. In the given example, the support for FG1 is 2 since it will be matched by {t1, t2}, and the support for FG2 is 5 since it be matched by {t4, t7, t8, t10, t11}. Therefore, FG2 has the highest frequency among the constructed fact groups.

The generated dataset (legislation-related facts) 1514 can be used to support multiple applications. One target application is performing a legislation-aware semantic expansion. A user might run a search query that contains facts, and the goal is to find cases that have similar facts. A part of the process is to semantically expand the facts in order to match more relevant cases. However, when expanding facts, the expansion must be aware of the legislation. Instead of using general-purpose ontologies to find semantically similar terms, the legislation-related facts dataset may be used.

An exemplary process of semantically expanding fact terms is described generally in FIG. 16. It starts by extracting 1602 facts 1604 from the search query (input text) 1606, which are used as queries 1608 to a dataset of legislation-related facts 1610. The goal is to retrieve fact groups 1612 to which the search query facts (input facts) 1604 belong. Then, the facts comparison and expansion module 1614 may be configured to compare the input facts 1604 with the matched fact groups 1612 in order to produce other facts 1616 that are semantically similar. The facts comparison and expansion module 1614 compares the components of the input fact (subject, predicate, object) 1604 against the components of each fact in the matched fact groups 1612. After finding most similar facts (or identical facts if available), the module 1614 finds other facts from the same fact groups and expands each component separately, producing other similar facts 1616.

As an example, assume that the search query is "Plaintiff's car struck a moose on the highway". One triple that is extracted from this query is (Plaintiff's car, strike, moose). When matched against the fact groups in a legislation-related fact dataset, FG2 is retrieved as the most relevant Fact Group. The Facts Comparison and Expansion module compares the query triple to other triples within FG2, and expands "car" to ["car", "vehicle", "truck", "motorcycle" ] and expands "moose" to ["moose", "deer" ]. These form the terms in the new search queries that will be used instead of the terms in the original search query. This restriction of expanded terms based on the legislation-related fact dataset has a significant legal implications since "moose" and "deer" are considered wildlife and do not have owners, as opposed to "cow" or "horse" which have other legal implications. A general-purpose semantic expansion tool cannot make this distinction.

Another application that utilizes a legislation-related fact dataset is finding relevant laws and statutes that apply to an input fact scenario. FIG. 17 depicts the high-level flowchart of this process. Given an input text 1702, the fact extraction module 1704 extracts facts from the text. The facts are used as queries 1706 to the legislation-related facts database 1708 in order to find the most relevant fact groups. The resulting fact groups from using each fact as a query are aggregated in order to find laws that are holistically most relevant to the set of extracted facts 1710. This application is useful for legal researchers who need to know which laws are most relevant to a particular factual scenario and use these laws and statutes to support their arguments.

Following up on the same example query discussed above, the extracted triple (Plaintiff's car, strike, moose) matches FG2, which has a high support among the cases that discuss hitting a wildlife animal on the highway. These cases usually cite the Highway Traffic Act, RSNL 1990, c H-3 that is related to driving under the speed limit.

An Exemplary System i. Factual Similarity System Controller

Figure 5:
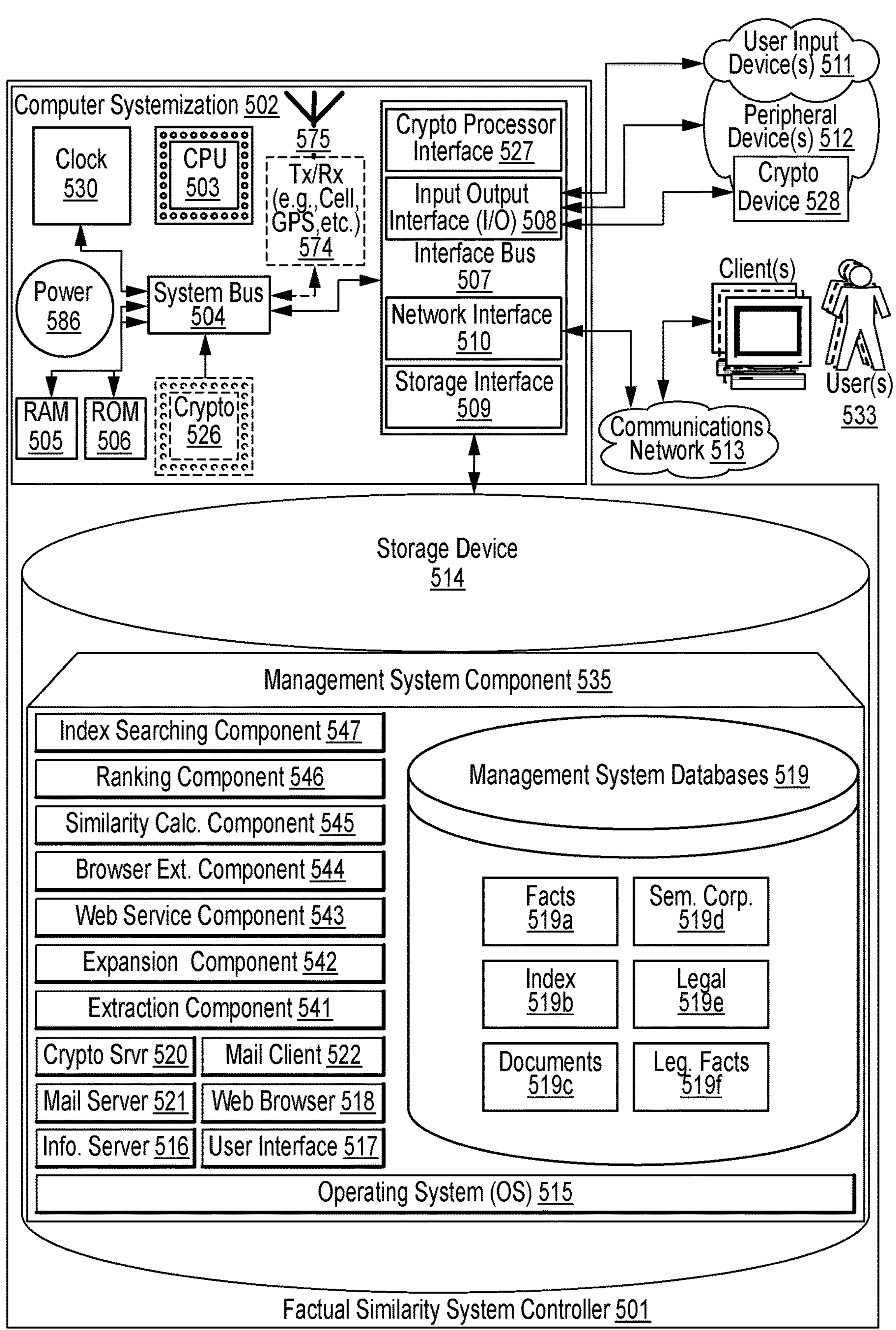
FIG. 5 shows a block diagram illustrating embodiments of a Factual Similarity System controller according to an exemplary embodiment.

FIG. 5 shows a block diagram illustrating embodiments of a Factual Similarity System controller. In this embodiment, the Factual Similarity System controller 501 may serve to aggregate, process, store, search, serve, identify, instruct, generate, match, and/or facilitate interactions with a computer, and/or other related data.

Typically, users, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the Factual Similarity System controller 501 may be connected to and/or communicate with entities such as, but not limited to: one or more users from user input devices 511; peripheral devices 512; an optional cryptographic processor device 528; and/or a communications network 513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The Factual Similarity System controller 501 may be based on computer systems that may comprise, but are not limited to, components such as: a computer systemization 502 connected to memory 529.

ii. Computer Systemization

A computer systemization 502 may comprise a clock 530, central processing unit ("CPU(s)" and/or "processor(s)" (these terms are used interchangeable throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices via the interface bus 1/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing Factual Similarity System controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself, internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the Factual Similarity System controller and beyond through various interfaces. Should processing requirements dictate a greater amount speed and/or capacity, distributed processors (e.g., Distributed Factual Similarity System), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the Factual Similarity System may be achieved by implementing a microcontroller such as CAST's R8051XC2 microcontroller; Intel's MCS 51 (i.e., 8051 microcontroller); and/or the like. Also, to implement certain features of the Factual Similarity System, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the Factual Similarity System component collection (distributed or otherwise) and/or features may be implemented via the microprocessor and/or via embedded components; e.g., via ASIC, coprocessor, DSP, FPGA, and/or the like. Alternately, some implementations of the Factual Similarity System may be implemented with embedded components that are configured and used to achieve a variety of features or signal processing.

Depending on the particular implementation, the embedded components may include software solutions, hardware solutions, and/or some combination of both hardware/software solutions. For example, Factual Similarity System features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the Factual Similarity System features. A hierarchy of programmable interconnects allow logic blocks to be interconnected as needed by the Factual Similarity System designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the Factual Similarity System may be developed on regular FPGAs and then migrated into a fixed version that more resembles ASIC implementations. Alternate or coordinating implementations may migrate Factual Similarity System controller features to a final ASIC instead of or in addition to FPGAs. Depending on the implementation all of the aforementioned embedded components and microprocessors may be considered the "CPU" and/or "processor" for the Factual Similarity System.

iii. Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 586 is connected to at least one of the interconnected subsequent components of the Factual Similarity System thereby providing an electric current to all subsequent components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

iv. Interface Adapters

Interface bus(ses) 507 may accept, connect, and/or communicate to a number of interface adapters, conventionally although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 510 may accept, communicate, and/or connect to a communications network 513. Through a communications network 513, the Factual Similarity System controller is accessible through remote clients 533*b* (e.g., computers with web browsers) by users 533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed Factual Similarity System), architectures may similarly be employed to pool, load balance, and/or otherwise increase the communicative bandwidth required by the Factual Similarity System controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the Factual Similarity System controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the Factual Similarity System controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the Factual Similarity System controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

v. Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the Factual Similarity System controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 529 will include ROM 506, RAM 505, and a storage device 514. A storage device 514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

vi. Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component(s) 522; cryptographic server component(s) 520 (cryptographic server); the Factual Similarity System component(s) 535; the fact extraction component 541; the triplet expansion component 542, the web service component 543; the browser extension component 544; the semantic similarity calculation component 545; the ranking component 546; the index searching component 547 and/or the like (i.e., collectively a component collection). These components may be stored and accessed from the storage devices and/or from storage devices accessible through an interface bus. Although non-conventional program components such as those in the component collection, typically, are stored in a local storage device 514, they may also be loaded and/or stored in memory such as: peripheral devices, RAM, remote storage facilities through a communications network, ROM, various forms of memory, and/or the like. Also, while the components are described separately herein, it will be understood that they may be combined and/or subdivided in any compatible manner.

vii. Operating System

The operating system component 515 is an executable program component facilitating the operation of the Factual Similarity System controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 10/8/7/2003/2000/98/95/3.1/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the Factual Similarity System controller to communicate with other entities through a communications network 513. Various communication protocols may be used by the Factual Similarity System controller as a subcarrier transport mechanism for interaction, such as, but not limited to: multicast, TCP/IP, UDP, unicast, and/or the like.

viii. Information Server

An information server component 516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the Factual Similarity System controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the Factual Similarity System databases 519, operating systems, other program components, user interfaces, Web browsers, and/or the like.

Access to the Factual Similarity System database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the Factual Similarity System. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the Factual Similarity System as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

ix. User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

x. Web Browser

A Web browser component 518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the Factual Similarity System enabled nodes. The combined application may be nugatory on systems employing standard Web browsers.

xi. Mail Server

A mail server component 521 is a stored program component that is executed by a CPU 503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the Factual Similarity System. Mail may also take the form of messages sent from one Factual Similarity System user to another that is not in the form of traditional email but is more akin to direct messaging or the like conventionally enabled by social networks.

Access to the Factual Similarity System mail may be achieved through a number of APIs offered by the individual Web server components and/or the operating system.

Also, a mail server may contain, communicate, generate, obtain, and/or provide program component, system, user, and/or data communications, requests, information, and/or responses.

xii. Mail Client

A mail client component 522 is a stored program component that is executed by a CPU 503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

xiii. Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the Factual Similarity System may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the Factual Similarity System component to engage in secure transactions if so desired. The cryptographic component facilitates the secure accessing of resources on the Factual Similarity System and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

xiv. The Factual Similarity System Databases

The Factual Similarity System databases component 519 may be embodied in one database and its stored data, may be embodied in two or more distinct databases and their stored data, or may be partially or wholly embodied in an unstructured manner. For the purposes of simplicity of description, discussion of the Factual Similarity System databases component 519 herein may refer to such component in the singular tense, however this is not to be considered as limiting the Factual Similarity System databases to an embodiment in which they reside in a single database. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the Factual Similarity System database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the Factual Similarity System database is implemented as a data-structure, the use of the Factual Similarity System database 519 may be integrated into another component such as the Factual Similarity System component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 may include several included databases or tables 519*a-f*, examples of which are described above.

In one embodiment, the Factual Similarity System database 519 may interact with other database systems. For example, employing a distributed database system, queries and data access by a search Factual Similarity System component may treat the combination of the Factual Similarity System databases 519, an integrated data security layer database as a single database entity.

In one embodiment, user programs may contain various user interface primitives, which may serve to update the Factual Similarity System. Also, various accounts may require custom database tables depending upon the environments and the types of clients the Factual Similarity System may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-f*. The Factual Similarity System may be configured to keep track of various settings, inputs, and parameters via database controllers.

The Factual Similarity System database may communicate to and/or with other components in a component collection, including itself, and/or facilities of the like. Most frequently, the Factual Similarity System database communicates with the Factual Similarity System component, other program components, and/or the like. The database may contain, retain, and provide information regarding other nodes and data.

xv. The Factual Similarity Systems

The Factual Similarity System component 535 is a stored program component that is executed by a CPU. In one embodiment, the Factual Similarity System component incorporates any and/or all combinations of the aspects of the Factual Similarity System that was discussed in the previous figures. As such, the Factual Similarity System affects accessing, obtaining and the provision of information, services, transactions, and/or the like across various communications networks. The features and embodiments of the Factual Similarity System discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the Factual Similarity System's features and facilities, and in many cases reduce the costs, energy consumption/requirements, and extend the life of Factual Similarity System's underlying infrastructure; this has the added benefit of making the Factual Similarity System more reliable. Similarly, many of the features and mechanisms are designed to be easier for users to use and access, thereby broadening the audience that may enjoy/employ and exploit the feature sets of the Factual Similarity System; such ease of use also helps to increase the reliability of the Factual Similarity System. In addition, the feature sets include heightened security as noted via the Cryptographic components 520, 526, 528 and throughout, making access to the features and data more reliable and secure.

The Factual Similarity System component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PUP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the Factual Similarity System server employs a cryptographic server to encrypt and decrypt communications. The Factual Similarity System component may communicate to and/or with other components in a component collection, including itself, and/or facilities of the like. Most frequently, the Factual Similarity System component communicates with the Factual Similarity System database, operating systems, other program components, and/or the like. The Factual Similarity System may contain, communicate, generate, obtain, and/or provide program component, system, user, and/or data communications, requests, and/or responses.

xvi. Distributed Factual Similarity Systems

The structure and/or operation of any of the Factual Similarity System node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the Factual Similarity System controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the Factual Similarity System controller may be executing a PUP script implementing a Secure Sockets Layer ("SSL") socket server via the information server, which listens to incoming communications on a server port to which a client may send data, e.g., data encoded in JSON format. Upon identifying an incoming communication, the PUP script may read the incoming message from the client device, parse the received JSON-encoded text data to extract information from the JSON-encoded text data into PUP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//set ip address and port to listen to for incoming data
$address='192.168.0.100';
$port=255;
```

```
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
  $input = "";
  $input = socket_read($client, 1024);
  $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

A. CONCLUSION

FIGS. 1 through 23 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for LEGAL FACTUAL SIMILARITY SYSTEM (including the Cover Page, Title, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. For example, aspects may be adapted for video, audio or any other content. While various embodiments and discussions have included reference to applications in the legal industry, it is to be understood that the embodiments described herein may be readily configured and/or customized for a wide variety of other applications and/or implementations.

What is claimed is:

1. A system comprising memory and one or more processors communicatively coupled to the memory, the one or more processors configured to:

- receive a reference text string via a user interface of a user computing device;
- extract a plurality of reference triples from the reference text string;
- expand each of the plurality of reference triples based at least in part on candidate multi-word combinations of a domain-specific semantic corpus to obtain a plurality of expanded reference triples, wherein each of the plurality of reference triples is expanded based at least in part on a normalization of one or more tokens of the associated reference triple to a base form prior to further expansion of the associated reference triple based at least in part on the domain-specific semantic corpus;
- access an index based upon each of the plurality of expanded reference triples, wherein the index includes a plurality of library document triples associated with each of a plurality of library documents;
- identify, based upon the access of the index, a plurality of library document triples and associated library documents similar to each of the plurality of expanded reference triples; and
- scoring the plurality of library documents and generating a scored list of the plurality of library documents based at least in part upon similarity scores between the plurality of expanded reference triples and the library document triples; and
- displaying the generated scored list of library documents to the user via the user interface.

2. The system of claim 1, wherein the one or more processors are further configured to:

- identify one or more fact groups related to each library document based at least in part on the associated expanded reference triples.

3. The system of claim 1, wherein the one or more processors are further configured to:

- form multi-word tokens as components of the plurality of reference triples based at least in part on the domain-specific semantic corpus; and
- normalize the multi-word tokens to the base form prior to further expansion of the plurality of reference triples.

4. The system of claim 1, wherein the one or more processors are further configured to:

- score the plurality of library documents based at least in part on an aggregation of the similarity scores.

5. The system of claim 1, wherein the one or more processors are further configured to:

- determine a similarity score of a library document based at least in part on a comparison between a respective library document triple and a corresponding expanded reference triple; and
- add the library document to the list in response to a determination that the similarity score satisfies a defined threshold value.

6. The system of claim 1, wherein the reference text string is a first reference text string, and wherein the one or more processors are further configured to:

- receive a second reference text string via the user interface;
- extract at least one second reference triple from the second reference text string;
- identify one or more expanded library triples similar to the at least one second reference triple; and
- update the list of library documents based at least in part on the one or more expanded library triples.

7. The system of claim 1, wherein the normalization of the one or more tokens is based at least in part on a natural language processing technique.

8. The system of claim 1, wherein the normalization of the one or more tokens is based at least in part on a stemming and lemmatization normalization technique.

9. A method, comprising:

- receiving a reference text string via a user interface of a user computing device;
- extracting a plurality of reference triples from the reference text string;

expanding each of the plurality of reference triples based at least in part on candidate multi-word combinations of a domain-specific semantic corpus to obtain a plurality of expanded reference triples, wherein each of the plurality of reference triples is expanded based at least in part on a normalization of one or more tokens of the associated reference triple to a base form prior to further expansion of the associated reference triple based at least in part on the domain-specific semantic corpus;

accessing an index based upon each of the plurality of expanded reference triples, wherein the index includes a plurality of library document triples associated with each of a plurality library documents;

identifying, based upon the access of the index, a plurality of library document triples and associated library documents similar to each of the plurality of expanded reference triples; and scoring the plurality of library documents and generating a scored list of the plurality of library documents based at least in part upon similarity scores between the plurality of expanded reference triples and the library document triples; and displaying the generated scored list of library documents to the user.

10. The method of claim 9, further comprising:

identifying one or more fact groups related to each library document based at least in part on the associated expanded reference triples.

11. The method of claim 9, further comprising:

forming multi-word tokens as components of the plurality of reference triples based at least in part on the domain-specific semantic corpus; and normalizing the multi-word tokens to the base form prior to further expansion of the plurality of reference triples.

12. The method of claim 9, further comprising:

scoring the plurality of library documents based at least in part on an aggregation of the similarity scores.

13. The method of claim 9, further comprising:

determining a similarity score of a library document based at least in part on a comparison between a respective library document triple and a corresponding expanded reference triple; and adding the library document to the list in response to a determination that the similarity score satisfies a defined threshold value.

14. The method of claim 9, wherein the reference text string is a first reference text string, and the method further comprising:

receiving a second reference text string via the user interface;

extracting at least one second reference triple from the second reference text string;

identifying one or more expanded library triples similar to the at least one second reference triple; and updating the list of scored library documents based at least in part on the one or more expanded library triples.

15. The method of claim 9, wherein the normalization of the one or more tokens is based at least in part on a natural language processing technique.

16. The method of claim 9, wherein the normalization of the one or more tokens is based at least in part on a stemming and lemmatization normalization technique.

17. A computer program product, stored on a non-transitory computer readable medium, comprising instructions that when executed by one or more processors cause the one or more processors to:

receive a reference text string via a user interface of a user computing device;

extract a plurality of reference triples from the reference text string;

expand each of the plurality of reference triples based at least in part on candidate multi-word combinations of a domain-specific semantic corpus to obtain a plurality of expanded reference triples, wherein each of the plurality of reference triples is expanded based at least in part on a normalization of one or more tokens of the associated reference triple to a base form prior to further expansion of the associated reference triple based at least in part on the domain-specific semantic corpus;

assess an index based upon each of the plurality of expanded reference triples, wherein the index includes a plurality of library document triples associated with each of the plurality of library documents;

identify, based upon the access of the index, a plurality of library document triples and associated library documents similar to each of the plurality of expanded reference triples; and score the plurality of library documents and generating a scored list of the plurality of library documents based at least in part upon similarity scores between the plurality of expanded reference triples and the library document triples; and display the generated scored list of library documents to the user via the user interface.

18. The computer program product of claim 17, wherein the one or more processors are further configured to:

identify one or more fact groups related to each library document based at least in part on the associated expanded reference triples.

19. The computer program product of claim 17, wherein the one or more processors are further configured to:

form multi-word tokens as components of the plurality of reference triples based at least in part on the domain-specific semantic corpus; and normalize the multi-word tokens to the base form prior to further expansion of the plurality of reference triples.

20. The computer program product of claim 17, wherein the one or more processors are further configured to:

score the plurality of library documents based at least in part on an aggregation of the similarity scores.

* * * * *